United States Patent
Hull et al.

(10) Patent No.: US 10,215,017 B2
(45) Date of Patent: Feb. 26, 2019

(54) APPARATUS FOR DETECTING ACOUSTIC SIGNALS IN A HOUSING

(71) Applicant: Hifi Engineering Inc., Calgary (CA)

(72) Inventors: John Hull, Calgary (CA); Seyed Ehsan Jalilian, Calgary (CA)

(73) Assignee: Hifi Engineering Inc., Calgary, Alberta (CA)

(*) Notice: Subject to any disclaimer, the term of this patent is extended or adjusted under 35 U.S.C. 154(b) by 331 days.

(21) Appl. No.: 15/103,750

(22) PCT Filed: Dec. 10, 2014

(86) PCT No.: PCT/CA2014/051192
§ 371 (c)(1),
(2) Date: Jun. 10, 2016

(87) PCT Pub. No.: WO2015/085423
PCT Pub. Date: Jun. 18, 2015

(65) Prior Publication Data
US 2016/0305235 A1    Oct. 20, 2016

Related U.S. Application Data

(60) Provisional application No. 61/916,004, filed on Dec. 13, 2013.

(51) Int. Cl.
*E21B 47/00* (2012.01)
*E21B 47/10* (2012.01)
(Continued)

(52) U.S. Cl.
CPC ............ *E21B 47/101* (2013.01); *E21B 47/00* (2013.01); *E21B 47/1025* (2013.01);
(Continued)

(58) Field of Classification Search
None
See application file for complete search history.

(56) References Cited

U.S. PATENT DOCUMENTS 4,745,238 A * 5/1988 Kotthaus ............... H01B 7/12
                                                                138/111
6,233,374 B1 * 5/2001 Ogle ..................... G01L 11/025
                                                                250/227.11
(Continued)

FOREIGN PATENT DOCUMENTS

CA       2743696 A1    12/2011
WO    WO2008/098380 A1   8/2008

OTHER PUBLICATIONS

International Search Report and Written Opinion of the International Searching Authority, dated Feb. 16, 2015, for corresponding International Application No. PCT/CA2014/051192, 9 pages.

*Primary Examiner* — Peter J Macchiarolo
*Assistant Examiner* — Jermaine L Jenkins
(74) *Attorney, Agent, or Firm* — Klarquist Sparkman, LLP

(57) ABSTRACT

An apparatus for detecting acoustic signals in housing is disclosed. The housing may be housing of a wellbore, riser, tubular or pipeline or the like for transporting fluids or housing of a vessel for storing fluids. The apparatus comprises a longitudinally extending tube having an internal surface and an external surface, a longitudinally extending fiber optic cable disposed within the tube, and one or more than one longitudinally extending outer fins radially extending outwards from and coupled with the external surface of the tube. The outer fin is configured to project towards the housing and allows fluid between the external surface of the tube and the housing when the apparatus is positioned in the housing. The apparatus may alternatively comprise a longitudinally extending fiber optic cable coated with a coating (Continued)

and one or more than one longitudinally extending outer fin radially extending outwards from and coupled with the coated fiber optic cable.

14 Claims, 8 Drawing Sheets

(51) Int. Cl.
*G01H 9/00* (2006.01)
*G01M 3/04* (2006.01)
*G01M 3/16* (2006.01)
*G01M 3/24* (2006.01)

(52) U.S. Cl.
CPC ............ *G01H 9/004* (2013.01); *G01M 3/047* (2013.01); *G01M 3/165* (2013.01); *G01M 3/243* (2013.01)

(56) References Cited

U.S. PATENT DOCUMENTS

| | | | |
|---|---|---|---|
| 6,983,796 B2 | 1/2006 | Bayne et al. | |
| 7,024,081 B2 | 4/2006 | Dowd et al. | |
| 7,245,791 B2* | 7/2007 | Rambow | E21B 47/0006 |
| | | | 385/12 |
| 7,327,907 B2* | 2/2008 | Shaibani | G01H 9/004 |
| | | | 385/12 |
| 7,424,190 B2 | 9/2008 | Dowd et al. | |
| 9,103,736 B2* | 8/2015 | Chen | G01L 1/246 |
| 9,194,973 B2* | 11/2015 | Chen | G01V 3/38 |
| 9,377,598 B2* | 6/2016 | Dowd | G02B 6/4492 |
| 9,557,239 B2* | 1/2017 | Chen | G01L 25/00 |
| 9,605,534 B2* | 3/2017 | Chen | E21B 47/1005 |
| 9,711,261 B2* | 7/2017 | Glew | H05K 9/0098 |
| 9,995,107 B2* | 6/2018 | Sherlin | B29C 70/462 |
| 2004/0065437 A1 | 4/2004 | Bostick et al. | |
| 2012/0111104 A1 | 5/2012 | Taverner et al. | |

* cited by examiner

APPARATUS FOR DETECTING ACOUSTIC SIGNALS IN A HOUSING

CROSS REFERENCE TO RELATED APPLICATIONS

This is the U.S. National Stage of International Application No. PCT/CA2014/051192, filed Dec. 10, 2014, which in turn claims the benefit of and priority to U.S. Provisional Application No. 61/916,004, filed Dec. 13, 2013. The provisional application is incorporated herein in its entirety.

TECHNICAL FIELD

This disclosure relates generally to an apparatus for detecting acoustic signals in a housing.

BACKGROUND

Production and transportation of oil and natural gas generally involves transporting the oil and gas along various types of channel housing. For example, during conventional oil and gas production, oil and gas are pumped out of a formation via production tubing that has been laid along a wellbore; in this example, the production tubing is the channel housing. Similarly, when hydraulic fracturing is used to produce oil and gas, the well in which the fracking is performed is the channel. As another example, oil and gas, whether refined or not, can be transported along a pipeline; in this example, the pipeline is the channel housing. In each of these examples, acoustic events may occur within the channel housing that are relevant to oil and gas production or transportation. For example, the pipeline or the production tubing may be leaking, and during fracking new fractures may be formed and existing fractures may expand. Each such event is an acoustic event as it makes a noise while it is occurring. Fibre optic cables can be deployed downhole for the detection of acoustic events in channel housing used for the production and transportation of oil and gas.

Fluid migration in oil or gas wells is generally referred to as "casing vent flow" (CVF) or "gas migration" (GM) and can refer to any one or more of the following phenomena:

Fluid flowing from the formation into an outermost annular portion of the wellbore behind an outermost casing string in the wellbore;

Fluid flowing from the outermost annular portion of the wellbore into the formation; and Fluid flowing across any of the casing or tubing strings in the wellbore.

Fluid includes gas or liquid hydrocarbons, including oil, as well as water, steam, or a combination thereof. Any fluid migration will produce an "acoustic signal". Acoustic signals resulting from the migration of fluid may be used as an identifier, or "diagnostic", of a leaking well. For example, gas may migrate as a bubble from the source up towards the surface, frequently taking a convoluted path that may progress into and/or out of the production casing, the surrounding earth strata and the cement casing of the wellbore, and may exit into the atmosphere through a vent in the well, or through the ground. As the bubble migrates, pressure may change and the bubble may expand or contract and may increase or decrease its rate of migration and produce an acoustic event.

Acoustic signals may also be used to detect fluid leaking from a pipeline, tubular, riser or the like transporting fluid such as oil or gas. The acoustic signature is analyzed for deviations from the baseline flow. Depending on the type of fluid being transported in a channel, a fluid leak may have a particular acoustic signature (e.g. high frequency, louder than usual acoustic magnitude, etc). Using software algorithms, an operator can analyze this acoustic signature and detect fluid leaks in the pipeline.

Fibre optic cables may also be deployed in vessels for storing a fluid and used to detect acoustic signals indicative of fluid leaking from the vessel.

SUMMARY

According to one aspect there is provided an apparatus for detecting acoustic signals in a housing. The apparatus comprises a longitudinally extending tube having an internal surface and an external surface; a longitudinally extending fibre optic cable disposed within the tube; and one or more than one outer fin radially extending outwards from and coupled with the external surface of the tube. The outer fin is configured to project towards the housing and allows fluid between the external surface of the tube and the housing when the apparatus is positioned in the housing.

The outer fin may be configured to contact the housing when the apparatus is positioned in the housing. The outer fin may radially extend outwards from the external surface of the tube in a helical pattern.

The apparatus may further comprise a filler material between the fibre optic cable and the internal surface of the tube.

The outer fin may be provided by an outer fin insert comprising a longitudinally extending body configured to receive the tube therein with the outer fin radially extending outwards from the body. The outer fin may be integral with the body. The outer fin insert may be extruded from an extrudable plastic. The external surface of the tube may be affixed to the body. The body may comprise a hollow tubular body. Alternatively, the body may comprise a U-shaped channel, and two or more outer fin inserts may be fitted together to at least partially surround the tube. The two or more outer fin inserts may be coupled to each other.

The outer fin may be provided by an outer fin insert comprising a longitudinally extending body with the outer fin radially extending inwards from the body.

The apparatus may further comprise one or more than one longitudinally extending inner fin, each inner fin extending between the internal surface of the tube and the fibre optic cable and coupled with the internal surface of the tube, the fibre optic cable, or both the internal surface of the tube and the fibre optic cable. The inner fin may be coupled with both the fibre optic cable and the internal surface of the tube such that there is mechanical coupling between the tube and the fibre optic cable.

The inner fin may be provided by an inner fin insert comprising a longitudinally extending inner fin insert body configured to receive the fibre optic cable therein with the inner fin radially extending outwards from the inner fin insert body. Alternatively, the inner fin may be provided by an inner fin insert comprising a longitudinally extending inner fin insert body configured to be received within the tube with the inner fin radially extending inwards from the inner fin insert body. The inner fin may be integral with the inner fin insert body. The inner fin insert may be extruded from an extrudable plastic. The inner fin insert body may comprise a hollow tubular body or a U-shaped channel.

The outer fin may be provided by a dual fin insert comprising the longitudinally extending tube with the outer fin radially extending outwards from the external surface of the tube and one or more than one inner fin radially extending inwards from the internal surface of the tube.

According to another aspect, there is provided an apparatus for detecting acoustic signals comprising a longitudinally extending fibre optic cable coated with a coating, and one or more than one longitudinally extending outer fin radially extending outwards from and coupled with the coated fibre optic cable.

The coating may be a flexible strength member. The outer fin may radially extend outwards from the coated fibre optic cable in a helical pattern.

The apparatus may be used in detecting an acoustic signal in a housing, wherein the outer fin is configured to project towards the housing and allow fluid between the coated fibre optic cable and the housing when the apparatus is positioned in the housing. The outer fin may be configured to contact the housing when the apparatus is positioned in the housing.

This summary does not necessarily describe the entire scope of all aspects. Other aspects, features and advantages will be apparent to those of ordinary skill in the art upon review of the following detailed description.

BRIEF DESCRIPTION OF FIGURES

In the accompanying drawings, which illustrate one or more exemplary embodiments.

DETAILED DESCRIPTION

Directional terms such as "top", "bottom", "upwards", "downwards", "vertically" and "laterally" are used in the following description for the purpose of providing relative reference only, and are not intended to suggest any limitations on how any article is to be positioned during use, or to be mounted in an assembly or relative to an environment.

The embodiments described herein generally relate to an apparatus for detecting acoustic signals in a housing. Fibre optic cables detect acoustic events and provide an indication of fluid migration occurring in channel housing used for the production and transportation of fluids, such as oil and gas. This information may be used to monitor and control downhole operations, for example to detect the creation and expansion of fractures during fracking. Acoustic events can also be monitored to provide an indication of leaks in a pipeline transporting fluid. Acoustic events in pipelines may also be monitor for other applications, for example, flow quantification, flow type detection, intrusion detection or for seismic monitoring. The channel housing may be any housing in which a fibre optic cable can be deployed to detect acoustic signals, for example, but not limited to, tubulars, risers, pipelines, wellbores and the like. The channel can be any cross-sectional shape or size and used for transporting any fluid, such as oil, gas or water. The fibre optic cable may also be deployed in a vessel housing, such as a fluid storage vessel, and may be used to detect fluid leaking from the vessel and for other applications.

Figure 1:
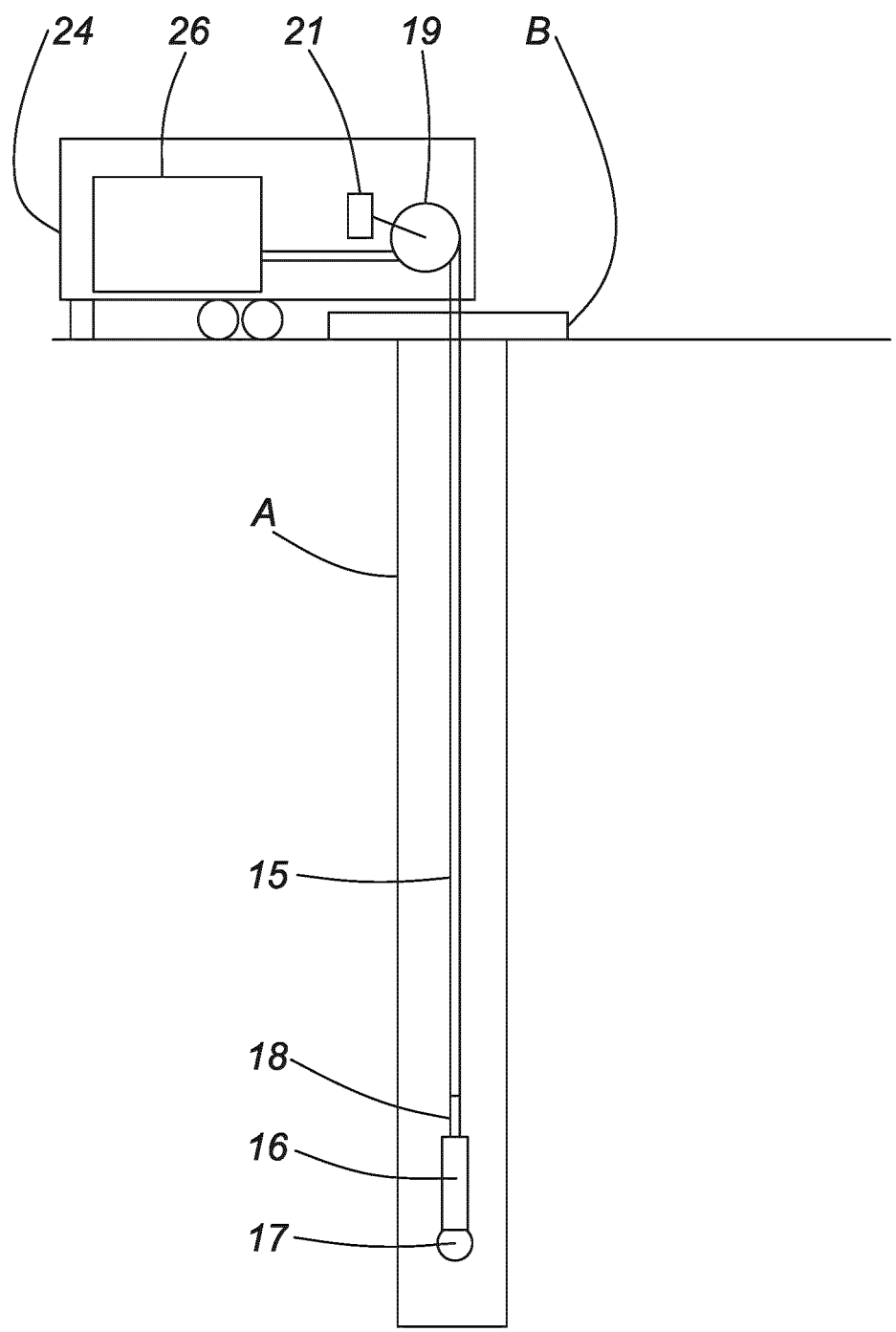
FIG. 1 is a schematic of an exemplary fibre optic cable assembly positioned in an abandoned wellbore.

Referring to the drawings and specifically to FIG. 1, there is shown an exemplary fibre optic cable assembly positioned in an abandoned wellbore A. The wellbore A comprises a surface casing, a production casing and optionally intermediate casing (not shown) cemented to the wellbore to support the sides of the well hole. At surface, a wellhead B closes or caps the abandoned wellbore A. The wellhead B comprises one or more valves and access ports (not shown) as is known in the art. The fibre optic cable assembly extends out of the wellbore 12 through a sealed access port (e.g. a "packoff") in the wellhead B such that a fluid seal is maintained in the wellbore A.

The fibre optic cable assembly comprises a fibre optic cable 15 and an acoustic transducer array 16 connected to a distal end of the cable 15 by an optical connector 18. A weight 17 is coupled to the distal end of the transducer array 16. The fibre optic cable 15 comprises a single fibre optic strand or a plurality of fibre optic strands encased in a flexible protective sheath. Such fibre optic cables 15 are known in the art for example as described in US 2011/0188346 (incorporated herein by reference) and are not described in detail.

A surface data acquisition unit 24 stores and deploys the cable assembly and includes a spool 19 for storing the cable assembly in coiled form. A motor 21 is operationally coupled to the spool 19 and can be operated to deploy and retract the cable assembly. The data acquisition unit 24 also includes optical signal processing equipment 26 that is communicative with the cable assembly for receiving and processing raw measurement data from the cable assembly. The data acquisition unit 24. In FIG. 1, the cable assembly spans the entire depth of the wellbore A and the acoustic transducer array 16 is positioned at the deepest point of the region of the wellbore A to be logged. The cable assembly may however span any desired depth or region to be logged.

In an abandoned wellbore, such as the one shown in FIG. 1, the fibre optic cable 15 is positioned within the wellbore casing. In a producing wellbore, the fibre optic cable 15 is typically positioned within a production tubing (not shown) through which a gas or liquid hydrocarbon flows when the wellbore is producing. The production tubing is positioned within the wellbore casing and generally protects the casing from wear, tear, corrosion, and deposition of by-products.

Figure 2:
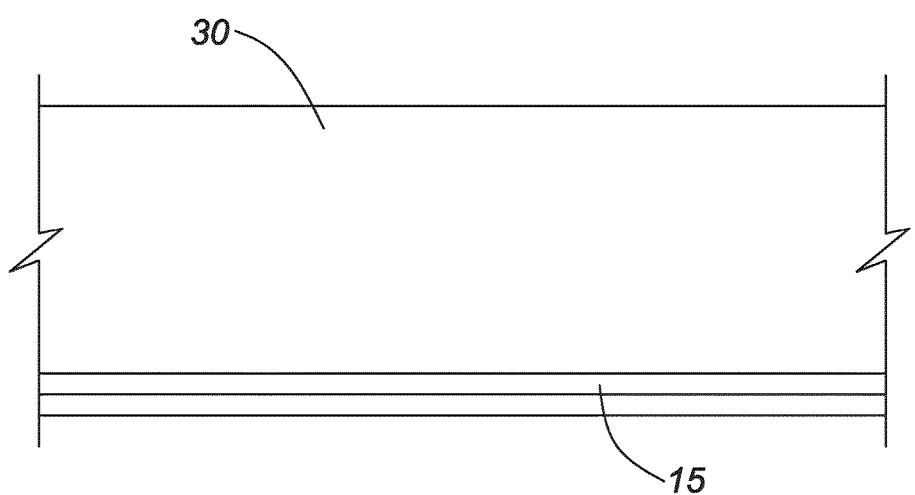
FIG. 2 is a schematic of an exemplary fibre optic cable assembly positioned in a pipeline.

Referring to FIG. 2, fibre optic cable 15 is positioned in a pipeline 30 for transporting fluids such as oil or gas. The fibre optic cable 15 detects acoustic signals generated in the pipeline 30 and provides an indication of where fluids are leaking from the pipeline. Acoustic events in the pipeline 30 may also be monitored for other applications, for example, flow quantification, flow type detection, intrusion detection or for seismic monitoring. The fibre optic cable 15 can be installed in the pipeline 30 on a temporary or permanent basis. In some embodiments fibre optic cables may be deployed such that they can be pulled out when necessary (for example when the pipeline operator is running pigs inside the pipe). For such deployments, the fibre optic cable 15 may be reeled in or out of the pipeline 30 using machinery known in the art.

Figure 3:
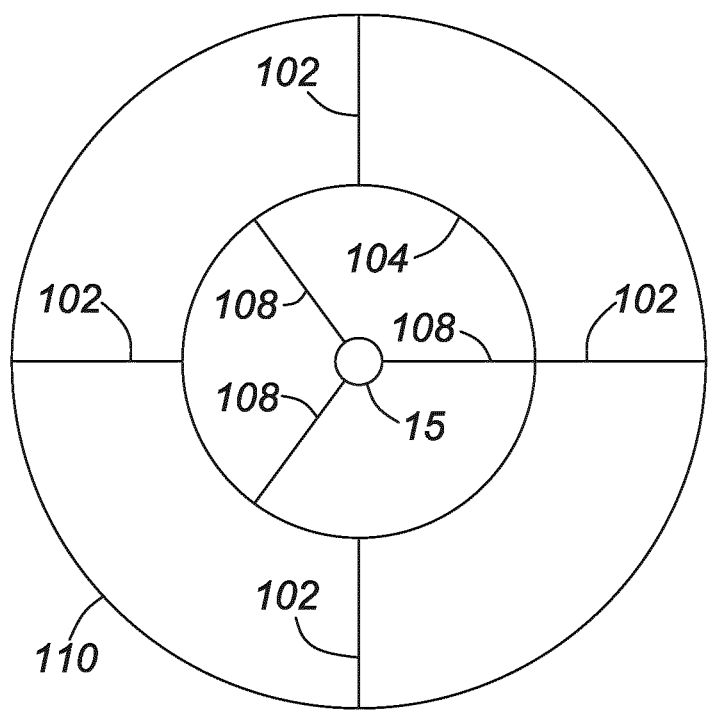
FIG. 3 is a schematic cross-section of a channel or vessel housing including an apparatus for detecting acoustic signals according to an embodiment.
Figure 4:
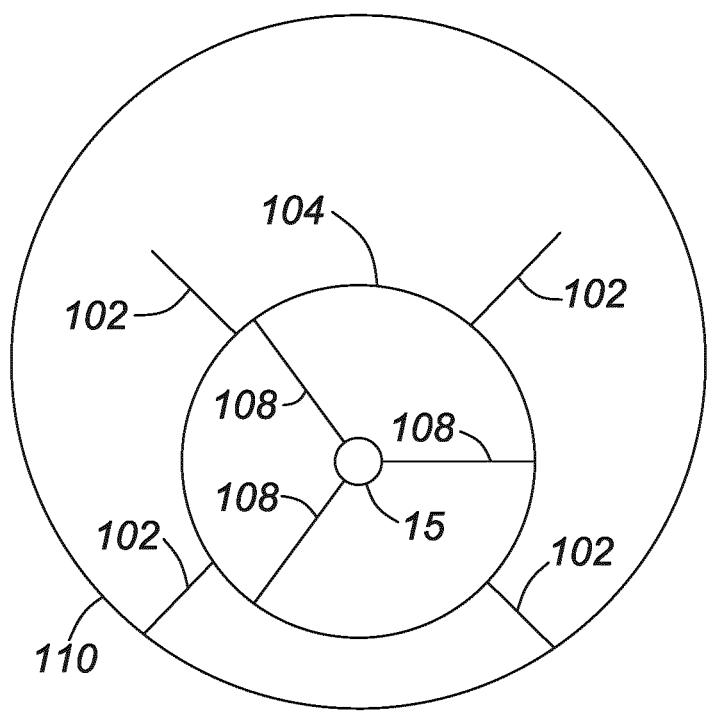
FIG. 4 is a schematic cross-section of a channel or vessel housing including an apparatus for detecting acoustic signals according to another embodiment.

Referring now to FIGS. 3 and 4, there is shown a cross section of a channel (such as a wellbore, pipeline, riser, tubular or the like) or vessel housing 110 with an apparatus for detecting acoustic signals according to an embodiment positioned therein. The apparatus comprises a tube 104 surrounding fibre optic cable 15 for protecting the fibre optic cable 15 from wear, tear, corrosion, and deposition of by-products. The tube 104 is typically made of metal but may be made of any material that protects the fibre optic cable 15 whilst allowing transfer of sound, for example but not limited to, a plastic or polymer material. In the embodiments shown in FIGS. 3 and 4, the tube 104 is a cylindrical hollow tube; however, in alternative embodiments (not shown) the tube may be any shape provided it surrounds and protects the fibre optic cable 15. The tube 104 with the enclosed fibre optic cable 15 is deployed within the channel or vessel housing 110. The housing 110 may for example be the production casing of an abandoned wellbore, the production tubing of a producing wellbore, the walls of a pipeline, a tubular or rising, or the walls of a fluid storage vessel depending on where the fibre optic cable 15 is deployed.

A plurality of outer fins 102 radially extend outwards from and are coupled with the external surface of the tube 104 and generally facilitate the propagation of acoustic signals to the tube 104. In the embodiment shown in FIG. 3, each of the outer fins 102 contacts the internal surface of the housing 110 and the tube 104 is centrally positioned within the housing. In the embodiment shown in FIG. 4, the outer fins 102 are shorter and the tube 104 is positioned in the bottom of the housing 110 with only some of the outer fins 102 making contact with the housing 110 at any time. The outer fins 102 may be any shape which allows fluid between the tube 104 and the housing 110. Without the outer fins 102, acoustic signals are conducted through the fluid flowing or contained within the housing 110; however the fins 102 are typically better conductors of sound than fluid. In addition, the outer fins 102 contact the tube 104 in a plurality of places providing multiple paths along which sound can travel to the tube 104. The outer fins 102 also maintain a space between the tube 104 and the housing 110 allowing fluid to surround the surface of the tube 104 for transfer of acoustic signals. There may be one or multiple outer fins 102 radially extending outwards from the external surface of the tube 104.

The tube 104 may be a metal tube, such as a fibre in metal tube as is known in the art, and the outer fins 102 may be provided by one or more fin insert attached to the metal tube 104 as is described below in more detail. Alternatively, the outer fins 102 may be directly connected or coupled to the tube 104. For example, the tube 104 may comprise a fin insert comprising a longitudinally extending hollow body as is described below in more detail, with the fin insert providing the tube 104 and the outer fins 102 of the apparatus. In embodiments were no metal tube is provided, the fibre optic cable 15 may be coated with a protective coating for example, but not limited to aramid yarn, Kevlar™ or the like. The protective coating protects the fibre optic cable 15 and is generally better at conducting acoustic signals than a metal tube.

In the embodiments shown in FIGS. 3 and 4, a plurality of inner fins 108 also extend between the fibre optic cable 15 and the internal surface of the tube 104. The inner fins 108 may beneficially provide acoustic coupling between the tube 104 and the fibre optic cable 15. The inner fins 108 may also provide mechanical support to the fibre optic cable 15 to minimize movement of the cable 15 within the tube 104. A filler material (not shown) may be provided between the inner fins 108 to fill the space between the external surface of the fibre optic cable 15 and the internal surface of the tube 104. Such filler materials are known in the art and include conventional thixotropic gels or grease compounds commonly used in the fibre optic cable industry for water blocking, filling and lubrication of fibre optic cables.

In alternative embodiments (not shown) there may be only one inner fin 108 and a filler material may be used to fill the space between the external surface of the fibre optic cable 15 and the internal surface of the tube 104. In further alternative embodiments (not shown) the inner fins 108 need not be present. In the absence of the inner fins 108, the filler material described above may be provided between the fibre optic cable 15 and the tube 104. However, in alternative embodiments, neither the inner fins 108 nor the filler material may be provided. In the embodiments shown in FIGS. 3 and 4, the inner fins 108 extend between and contact both the fibre optic cable 15 and the internal surface of the tube 104, however in alternative embodiments (not shown), the inner fins 108 may be coupled with only the internal surface of the tube 104 or with only the fibre optic cable 15. The innovative aspects apply equally in embodiments such as these.

Referring to FIGS. 5 to 9, there are shown different embodiments of a fin insert providing the outer fins 102 and optionally the inner fins 108 of the apparatus for detecting acoustic signals. The fin insert may be extruding from an extrudable plastic for example, but are not limited to, thermoplastics, such as polyether ether ketone (PEEK) and Hytrel™.

Figure 5:
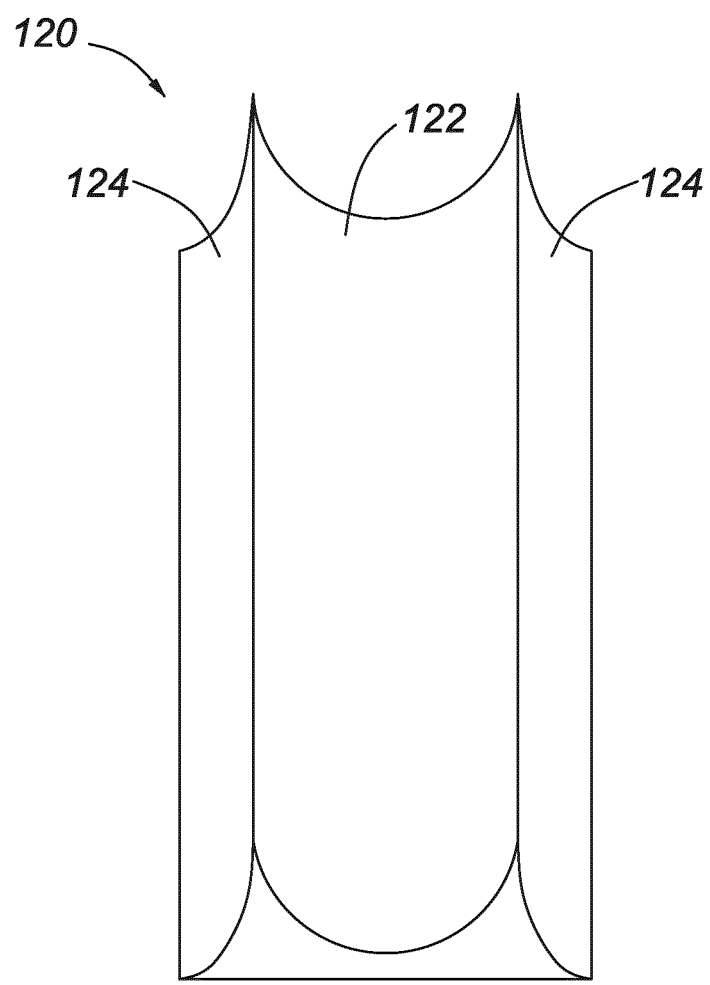
FIG. 5 is a perspective view of a first embodiment of a fin insert for use in the apparatus.

In the embodiment shown in FIG. 5, fin insert 120 comprises a body section 122 with a longitudinally extending U-shaped channel and two longitudinally extending fin sections 124 on opposed sides of the body section 122. In alternative embodiments (not shown) only one or additional longitudinally extending fins sections 124 may be provided. The fin sections 124 provide the inner fins 108 or the outer fins 102 of the apparatus depending on the positioning of the insert. The U-shaped channel is shaped to receive a tubular member; which tubular member may be the fibre optic cable 15 when the fin insert 120 is used to provide the inner fins 108, or the tube 104 when the fin insert 120 is used to provide the outer fins 102. The size and shape of the U-shaped channel varies depending on which tubular member is received within the U-shaped channel. Furthermore the fin sections 124 may vary in size depending on the gap they are dimensioned to span. Two or more fin inserts 120 may be fitted together to partially or completely surround the tubular member and the inserts 120 may be coupled to each other, for example by welding, clamping or using one or more fasteners. Alternatively, or additionally, the body section 122 of the one or more fin inserts 120 may be affixed to the tubular member using an adhesive, clamp or alternative fixing mechanism known in the art.

Figure 6:
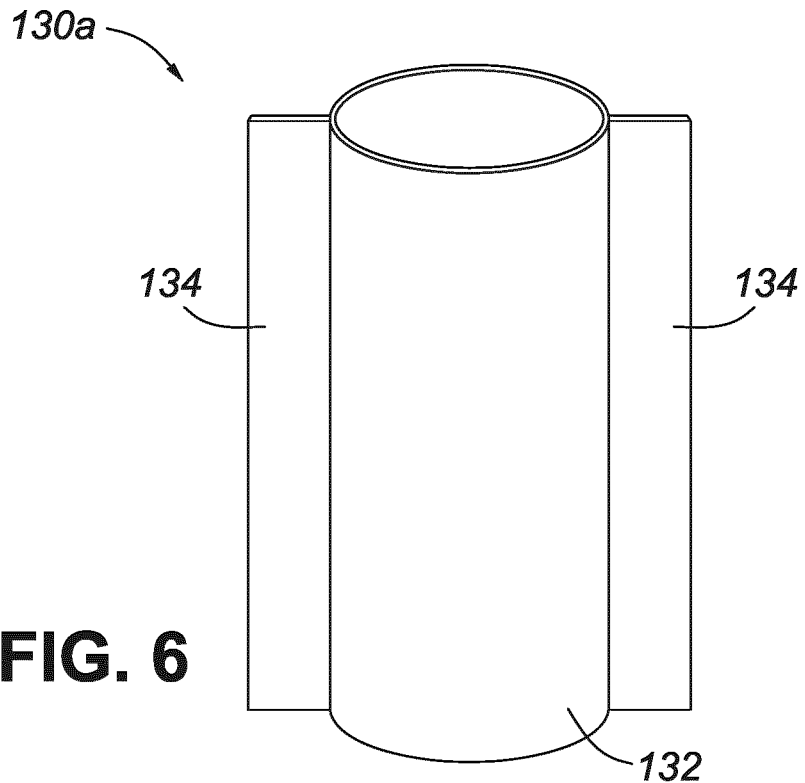
FIG. 6 is a perspective view of a second embodiment of a fin insert for use in the apparatus.

In FIG. 6, fin insert 130a comprises a longitudinally extending hollow body 132 with a plurality of longitudinally extending fins 134 extending radially outwards from the external surface of the body 132. The fin insert 130a may comprise two or more of the fin inserts 120 described above with reference to FIG. 5 coupled to each other to provide the longitudinally extending hollow body 132.

Figure 7:
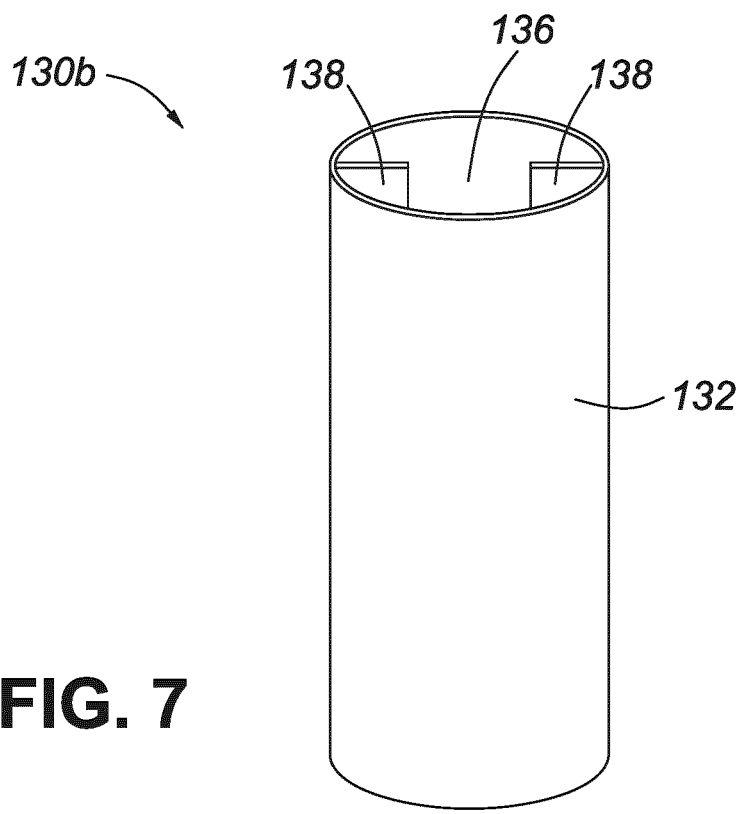
FIG. 7 is a perspective view of a third embodiment of a fin insert for use in the apparatus.

Fin insert 130b shown in FIG. 7 includes a plurality of longitudinally extending fins 138 extending radially inwards from the internal surface of the body 132. The inward extending fins 138 do not meet in the centre of the body 132 and there is a space 136 between the fins 138 for receiving the fibre optic cable 15 or the tube 104.

Figure 8:
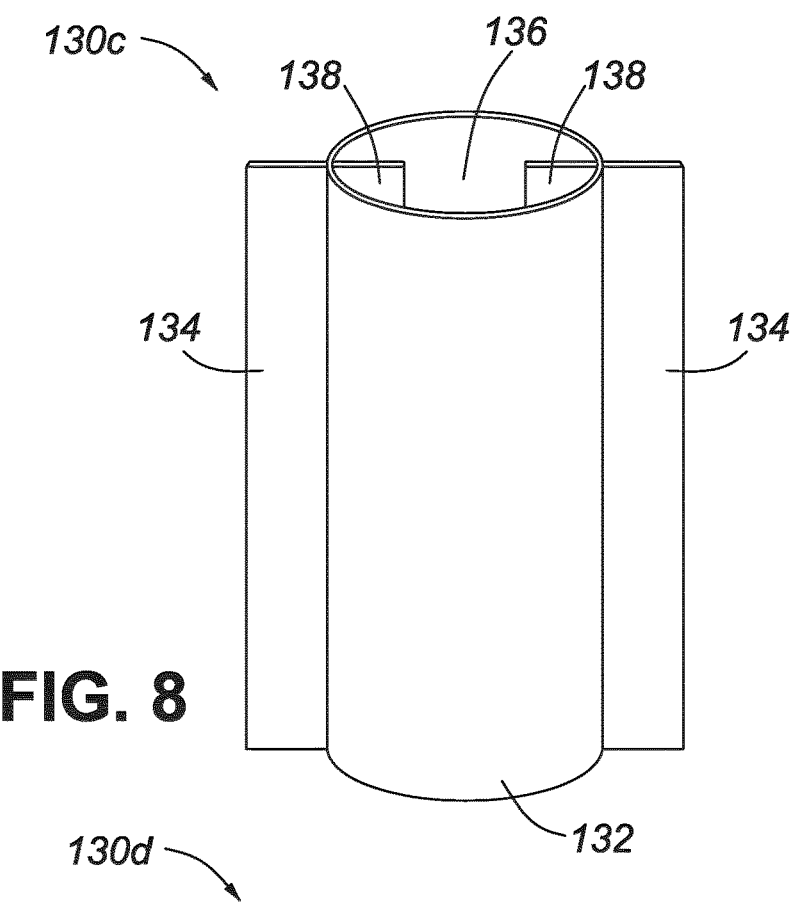
FIG. 8 is a perspective view of a fourth embodiment of a fin insert for use in the apparatus.

In FIG. 8, fin insert 130c includes fins 134 extending radially outwards from the external surface of the body 132 and fins 138 extending radially inwards from the internal surface of the body 132. The inward extending fins 138 do not meet in the centre of the body 132 and there is a space 136 between the fins 138 for receiving the fibre optic cable 15 or the tube 104.

Figure 9:
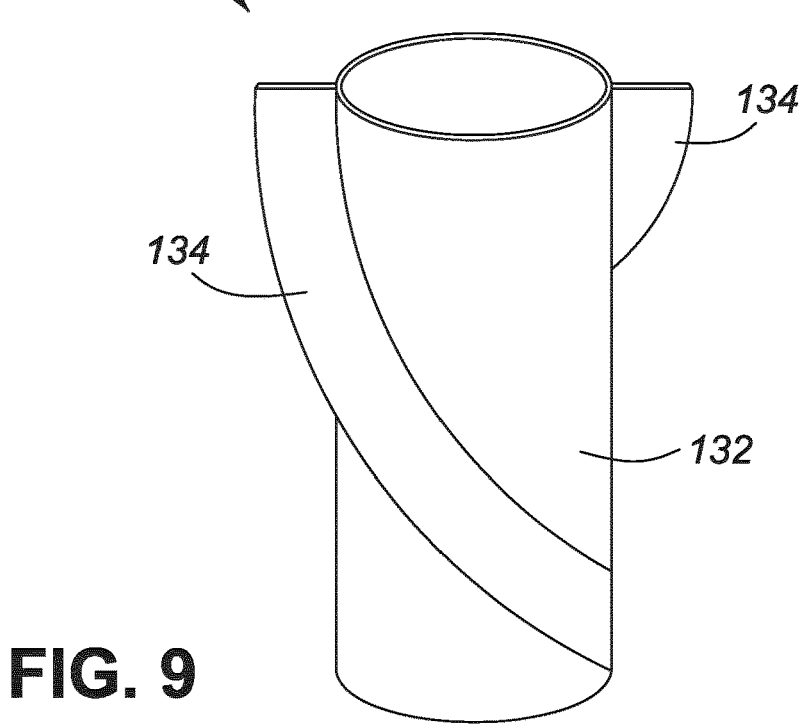
FIG. 9 is a perspective view of a fifth embodiment of a fin insert for use in the apparatus.

The longitudinally extending fins 134 of fin insert 130d shown in FIG. 9 extend radially outwards from the external surface of the body 132 in a helical pattern. In alternative embodiments (not shown) other patterns of fins extending inwardly or outwardly from the longitudinally extending body 132 may be utilized.

The fin inserts 130a,b,c,d may be made from a plastic or metal material that facilitates the propagation of acoustic signals generated by fluid migration. The plastic material may be an extrudable plastic, for example, but not limited to a thermoplastic, such as polyether ether ketone (PEEK) or Hytrel™. The fins 134, 138 may be unitarily formed with the hollow body 132 during an extrusion process, or may be coupled to the hollow body 132 by other fabrication processes or by mechanical mechanisms such as clamps.

Fin inserts 130a, 130b, 130d may be dimensioned to be positioned between the tube 104 and the housing 110 to provide the outer fins 102. More specifically, for fin inserts 130a and 130d (shown in FIGS. 6 and 9 respectively), the hollow body 132 is dimensioned to receive the tube 104 therein and the fins 134 project outwards towards the housing 110. For fin insert 130b (shown in FIG. 7), the body 132 is dimensioned to be received within the housing 110 and the fins 138 project inwards towards the tube 104, with the tube 104 being received within the space 136 between the inward extending fins 138.

Fin inserts 130a, 130b, 130d may also be dimensioned to be positioned between the tube 104 and the fibre optic cable 15 to provide the inner fins 108. More specifically, for fin inserts 130a and 130d (shown in FIGS. 6 and 9 respectively), the hollow body 132 is dimensioned to receive the fibre optic cable 15 therein and the fins 134 project outwards towards the tube 104, and for fin insert 130b (shown in FIG. 7), the body 132 is dimensioned to be received within the tube 104 and the fins 138 project inwards towards the fibre optic cable 15, with the fibre optic cable 15 being received within the space 136 between the inward extending fins 138.

In further embodiments, the hollow body 132 of fin inserts 130a, 130b, 130c, 130d may comprise the tube 104 so the fin insert provides the dual purpose of protecting the cable and providing fins for conducting acoustic signals. For fin insert 130c (shown in FIG. 8), fins 134 project outwards towards the housing 110 and fins 138 project inwards towards the fibre optic cable 15, with the fibre optic cable 15 being received within the space 136 between the inward extending fins 138.

Figure 10:
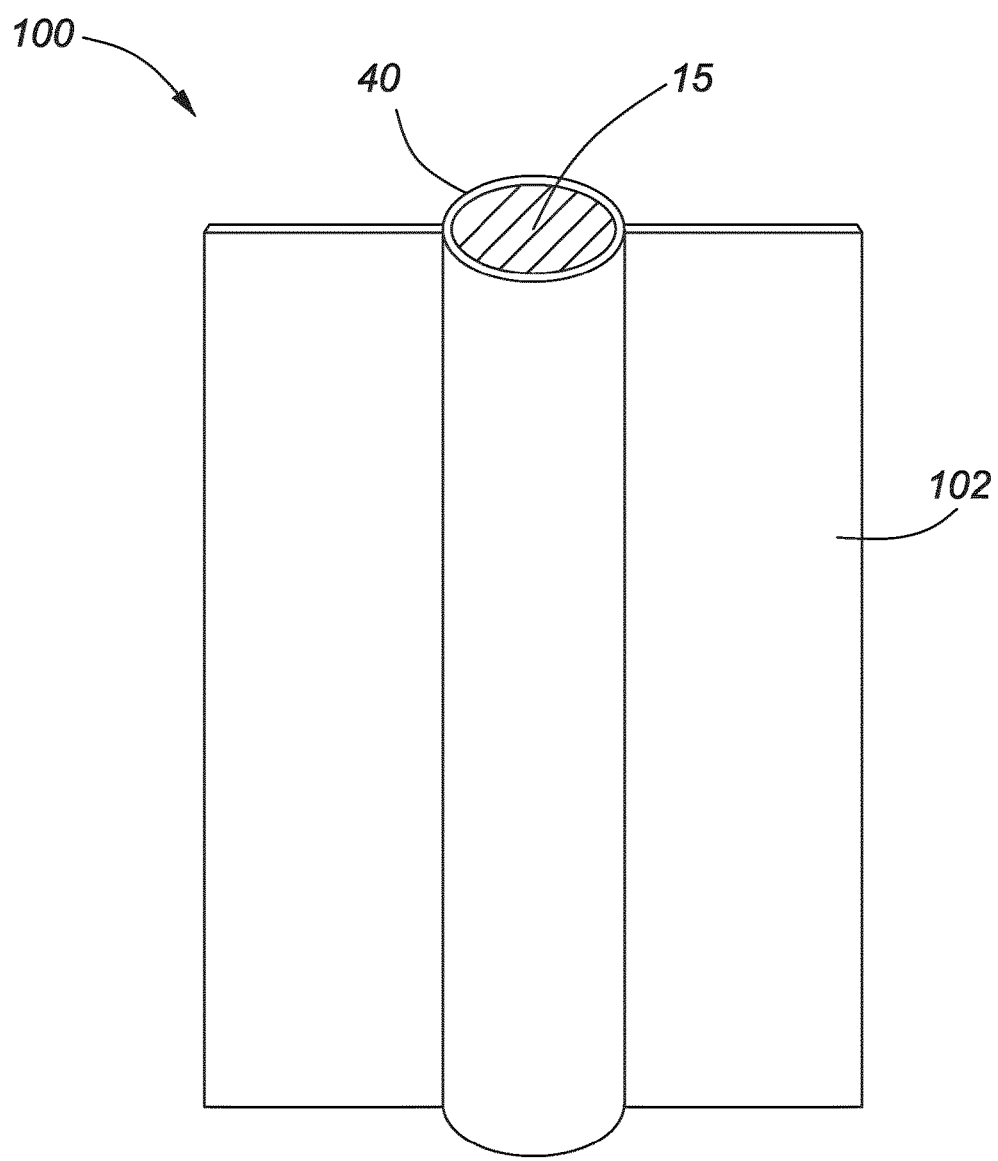
FIG. 10 is a perspective view of an apparatus for detecting acoustic signals according to another embodiment.

Referring to FIG. 10, there is shown an alternative embodiment of an apparatus 100 for detecting acoustic signals. Apparatus 100 comprises a fibre optic cable 15 coated with a protective coating 40 with fins 102 extending outwards from the coating 40. The coating 40 may be any material that provides tensile strength to the fibre optic cable 15 and may be flexible for example, but not limited to Aramid yarn, Kevlar™ or the like. The coating 40 protects the fibre optic cable 15 and is generally better at conducting acoustic signals than a metal tube. The fins 102 beneficially provide some protection to the fibre optic cable 15 when it is deployed in housing such as a channel or vessel housing as well as conducting acoustic signals to the cable 15. Apparatus 100 may also be laid along or wrapped around a pipeline, mandrel or the like for detecting acoustic signals.

While particular embodiments have been described in the foregoing, it is to be understood that other embodiments are possible and are intended to be included herein. It will be clear to any person skilled in the art that modification of and adjustments to the foregoing embodiments, not shown, are possible.

The invention claimed is:

1. An apparatus for detecting acoustic signals in a housing, the apparatus comprising:
    a longitudinally extending tube having an internal surface and an external surface;
    a longitudinally extending fibre optic cable disposed within the tube;
    one or more than one outer fin radially extending outwards from and coupled with the external surface of the tube, the outer fin configured to project towards the housing and allow fluid between the external surface of the tube and the housing when the apparatus is positioned in the housing; and
    one or more than one longitudinally extending inner fin, each inner fin extending between the internal surface of the tube and the fibre optic cable and coupled with the internal surface of the tube, the fibre optic cable, or both the internal surface of the tube and the fibre optic cable.

2. The apparatus of claim 1, wherein the outer fin is configured to contact the housing when the apparatus is positioned in the housing.

3. The apparatus of claim 1, further comprising a filler material between the fibre optic cable and the internal surface of the tube.

4. The apparatus of claim 1, wherein the outer fin is provided by an outer fin insert comprising a longitudinally extending body configured to receive the tube therein with the outer fin radially extending outwards from the body.

5. The apparatus of claim 4, wherein the external surface of the tube is affixed to the body.

6. The apparatus of claim 4, wherein the body comprises a hollow tubular body.

7. The apparatus of claim 4, wherein the body comprises a U-shaped channel.

8. The apparatus of any claim 1, wherein the outer fin is provided by an outer fin insert comprising a longitudinally extending body with the outer fin radially extending inwards from the body.

9. The apparatus of claim 1, wherein the inner fin is coupled with both the fibre optic cable and the internal surface of the tube such that there is mechanical coupling between the tube and the fibre optic cable.

10. The apparatus of claim 1, wherein the inner fin is provided by an inner fin insert comprising a longitudinally extending inner fin insert body configured to receive the fibre optic cable therein with the inner fin radially extending outwards from the inner fin insert body.

11. The apparatus of claim 10, wherein the inner fin insert body comprises a hollow tubular body.

12. The apparatus of claim 1, wherein the inner fin is provided by an inner fin insert comprising a longitudinally extending inner fin insert body configured to be received within the tube with the inner fin radially extending inwards from the inner fin insert body.

13. The apparatus of claim 1, wherein the outer fin radially extends from the external surface of the tube in a helical pattern.

14. An apparatus for detecting acoustic signals in a housing, the apparatus comprising:
- a longitudinally extending tube having an internal surface and an external surface;
- a longitudinally extending fibre optic cable disposed within the tube; and
- one or more than one outer fin radially extending outwards from and coupled with the external surface of the tube, the outer fin configured to project towards the housing and allow fluid between the external surface of the tube and the housing when the apparatus is positioned in the housing,
- wherein the outer fin is provided by a dual fin insert comprising the longitudinally extending tube with the outer fin radially extending outwards from the external surface of the tube and one or more than one inner fin radially extending inwards from the internal surface of the tube.

\* \* \* \* \*